United States Patent [19]

Wassel et al.

[11] 4,268,354
[45] May 19, 1981

[54] NUCLEAR REACTOR IN CORE FLUX MAPPING SYSTEM

[75] Inventors: William W. Wassel, Trafford; Gilbert W. Remley, Sharpsburg, both of Pa.

[73] Assignee: Westinghouse Electric Corp., Pittsburgh, Pa.

[21] Appl. No.: 950,651

[22] Filed: Oct. 12, 1978

[51] Int. Cl.³ .............................................. G21C 17/00
[52] U.S. Cl. ................................................ 176/19 EC
[58] Field of Search ............... 176/19 R, 19 EC, 19 J, 176/20 R, 22, 24; 250/390–392; 340/172.5

[56] References Cited

U.S. PATENT DOCUMENTS

| | | | |
|---|---|---|---|
| 3,565,760 | 2/1971 | Parkos et al. | 176/19 EC |
| 3,888,772 | 6/1975 | Neuner | 176/19 J |
| 3,895,223 | 7/1975 | Neuner et al. | 176/19 EC |
| 3,903,403 | 9/1975 | Ferguson et al. | 176/19 EC |
| 3,932,211 | 1/1976 | Loving, Jr. | 176/19 R |
| 4,012,717 | 3/1977 | Censier et al. | 340/172.5 |
| 4,030,074 | 6/1977 | Giorcelli | 235/153 AE |
| 4,032,757 | 6/1977 | Eccles | 235/153 AE |

*Primary Examiner*—S. A. Cangialosi
*Attorney, Agent, or Firm*—Daniel C. Abeles

[57] ABSTRACT

A nuclear reactor flux mapping system having a plurality of neutron detectors operable to be driven into and out of a reactor core along any one of a number of pre-established paths. The detectors, corresponding drives (22) and drive controllers (28) are arranged into at least two physically separate and functionally independent channels. Each channel is respectively arranged to scan complementary paths through the core during normal system operation. At least two, redundant, functionally independent and physically separate "command end of processing" channels (31 and 33) are provided. Each of the command and processing channels (30) are independently operable to automatically, programmably sequence the detector scans and process the detector output data on all of the detector channels while being electrically buffered from each detector channel through two-ported memories (36) in a manner to prevent faults on any of the channels from disabling any of the other system channels. Each detector channel is operable to scan the entire core in the event the other detector channel should prove inoperable.

12 Claims, 6 Drawing Figures

NUCLEAR REACTOR IN CORE FLUX MAPPING SYSTEM

CROSS REFERENCE TO RELATED APPLICATIONS

This invention is related to application Ser. No. 950,650 by J. A. Neuner and R. M. Oates, filed concurrently herewith and assigned in common with this application to the Westinghouse Electric Corporation, Pittsburgh, PA.

BACKGROUND OF THE INVENTION

This invention pertains generally to nuclear reactor flux mapping systems and more particularly to such systems that generate axial flux profiles of the core from movable in-core detectors.

Nuclear reactor flux mapping systems such as the system described in U.S. Pat. No. 3,932,211, issued Jan. 13, 1976 are used to provide measurements of the three-dimensional flux distribution in a nuclear reactor core. Three-dimensional core maps are not only very desirable, but at times required by Governmental regulation. The flux mapping system is basically composed of a detector drive system which provides the mechanical means for routing movable detectors into and out of the core, and a flux mapping control system which provides automatic control of the drive system operation, data gathering, system output, and operator interface.

Inasmuch as the flux mapping system provides detailed information of the core operation, which is highly desirable in the control of normal plant operation, and provides the added capacity of improved fuel management, it is desirable to increase the reliability of such systems. Normal methods of increasing system reliability through redundancy and separation can be effective, depending upon the extent of the redundancy employed, but is often extremely costly.

Accordingly, an improved flux mapping system is desired with improved reliability and versatility so that the loss of a single component or multiple different components is not likely to disable the system.

SUMMARY OF THE INVENTION

Briefly, this invention satisfies the foregoing objectives in providing an improved nuclear reactor flux mapping system by placing functionally separate and independent detector channels (23 and 25) under the control of redundant, independent, buffered "command and processing" channels (31 and 33). In the improved system, a plurality of neutron detectors are operable to be driven into and out of the reactor core along any one of a number of pre-established paths. The detectors, corresponding drives and drive controllers (22) are arranged into at least two physically separate and functionally independent channels (23 and 25). Each detector channel is arranged to scan complementary routes of the pre-established paths through the core during normal system operation.. At least two redundant, functionally independent and physically separate command and processing channels each (31 and 33), alternatively, independently operate to automatically sequence the detector scans and process the detector output data on all of the detector channels while being electrically buffered from each detector channel and each other in a manner to prevent faults on any of the channels from disabling any other channel. If either detector channel becomes inoperable, the remaining channel is operable to scan substantially all of the pre-established paths.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENT

Flux mapping systems generally permit a three-dimensional measurement of the reactor core power profile, which is an extremely accurate measure of the relative power sharing within the reactor core. This data is used to detect fine-structure power peaking and provides a basis for fuel management and other reactor control functions. A flux map is the measure of the neutron intensity of many areas of the core. This is accomplished by making successive passes of a neutron sensitive detector axially through the core and the data, in the form of detector current magnitudes versus position, constitutes the flux map. The flux mapping system of this invention can basically be divided into two subsystems; a detector and drive system and a command and processing system.

Figure 1:
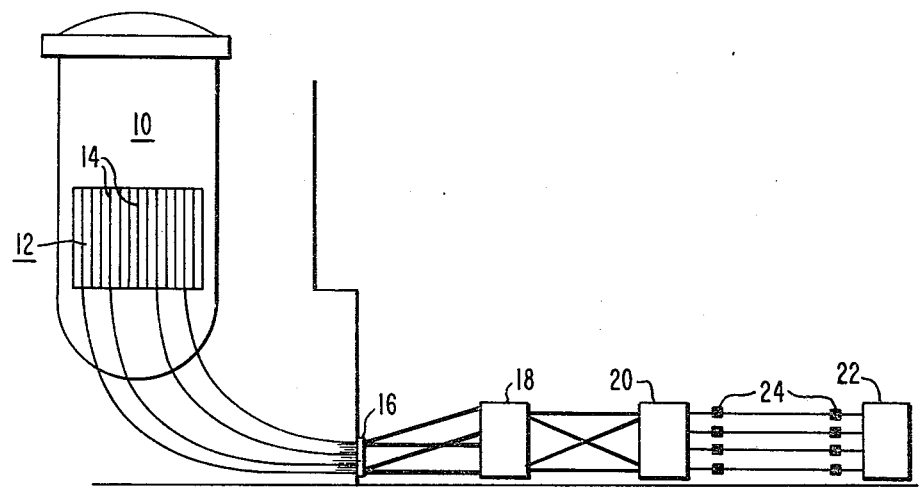
FIG. 1 is a perspective view illustrating the basic detector drive arrangement employed in the flux mapping system of this invention.
Figure 2:
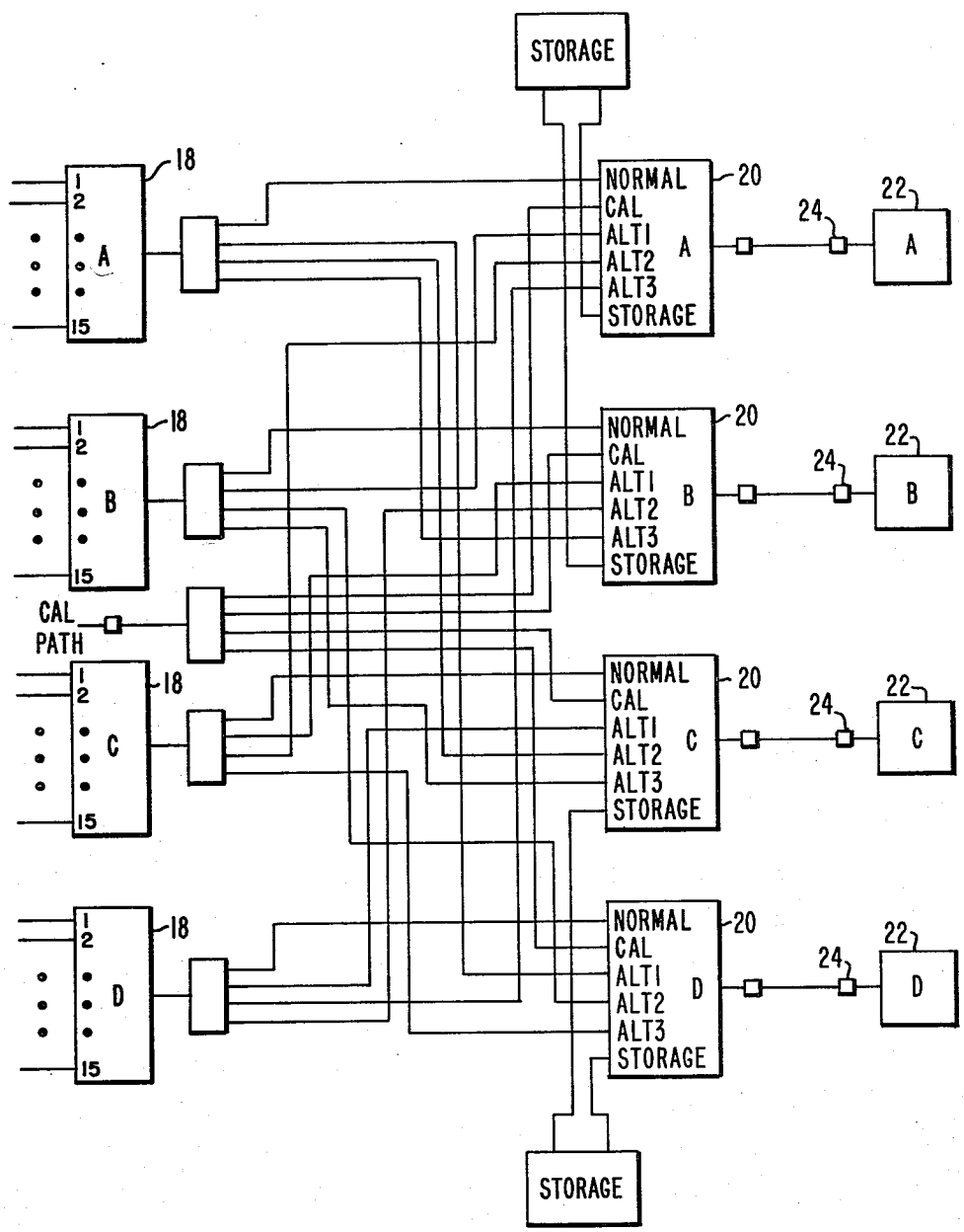
FIG. 2 is a more detailed schematic of the detector drive system illustrated in FIG. 1.

The detector drive system provides the mechanical means for routing movable detectors to various thimbles and into and out of the reactor core. For example, one type of commercial pressurized water reactor includes fifty eight such thimbles, though it should be appreciated that that number of thimbles may vary from plant to plant. A schematic representation of a typical drive system for a flux mapping system incorporating approximately sixty thimbles is illustrated in FIGS. 1 and 2. The drive units 22, six path transfer devices 20 and fifteen path transfer devices 18 allow each of four detectors to be routed into any one of the sixty thimbles, although, as will be appreciated from the description to follow, in normal operation, each detector will access only fifteen thimbles. The connections between transfer devices for coupling the thimbles into which the different detectors can be routed are illustrated in more detail in FIG. 2.

FIG. 1 shows the basic system for the insertion of the movable miniature detectors. Retractable thimbles 14, into which the miniature detectors are driven take the routes approximately as shown. The thimbles are inserted into the reactor core 12 through conduits extending from the bottom of the reactor vessel 10 through a concrete shield area, and then to a thimble seal plate 16. Since the detector thimbles are closed at the leading (reactor) end, they are dry inside. The thimbles thus serve as a pressure barrier between the reactor water pressure (2500 psig design) and the atmosphere. Mechanical seals between the retractable thimbles and the conduits are provided at the seal plate 6. The conduit within the reactor core into which the detectors are driven are essentially extensions of the reactor vessel, with the thimbles allowing the insertion of the in-core instrumentation movable miniature detectors.

The drive system for inserting the miniature detectors includes the drive units 22, limit switch assemblies 24 and transfer devices 18 and 20.

Each drive unit 22 pushes a hollow helical-wrapped drive cable into the core with a miniature detector attached to the leading end of the cable and a small diameter coaxial cable, which communicates the detector output, threaded through the hollow center of the cable back to the drive unit. The data gathered from the detectors is communicated to a CRT, printer, floppy disc, and the plant process computer. As will be appreciated by reference to FIG. 3, in accordance with one embodiment of this invention, the detector drive subsystems are divided into two separate channels figuratively illustrated by the partition 26. Each channel, though identical in component structure, is not coupled to function redundantly during normal system operation. Though separated into identical component subsections, each channel of the detector drive subsystem automatically controls its corresponding detector drive units and transfer devices to scan complementary sections of the core. For example, in the embodiment illustrated in FIG. 3, detector drive trains A and B scan one-half of the core and detector drive trains C and D scan the second half of the core. The preprogrammed selection of thimbles, and sequencing and control of drive trains are implemented by the microprocessors 28.

Both drive channels, in coordinating their complementary operation, are under the control of one of two separate, independent, redundant command and processing channels 30. Each of the command and processing channels includes a CRT and keyboard 32 for operator interface, a microprocessor 34 for commanding each of the drive trains, two-ported memories 36 to buffer the command and processing channels from the separate drive train channels and from each other, a controller 38 for selectively, programmably distributing the data received from the detectors to separate printers 40, floppy discs 42, and data links 44. The separate line of system redundancy is figuratively illustrated by the dotted line 46 shown in FIG. 3.

Figure 3:
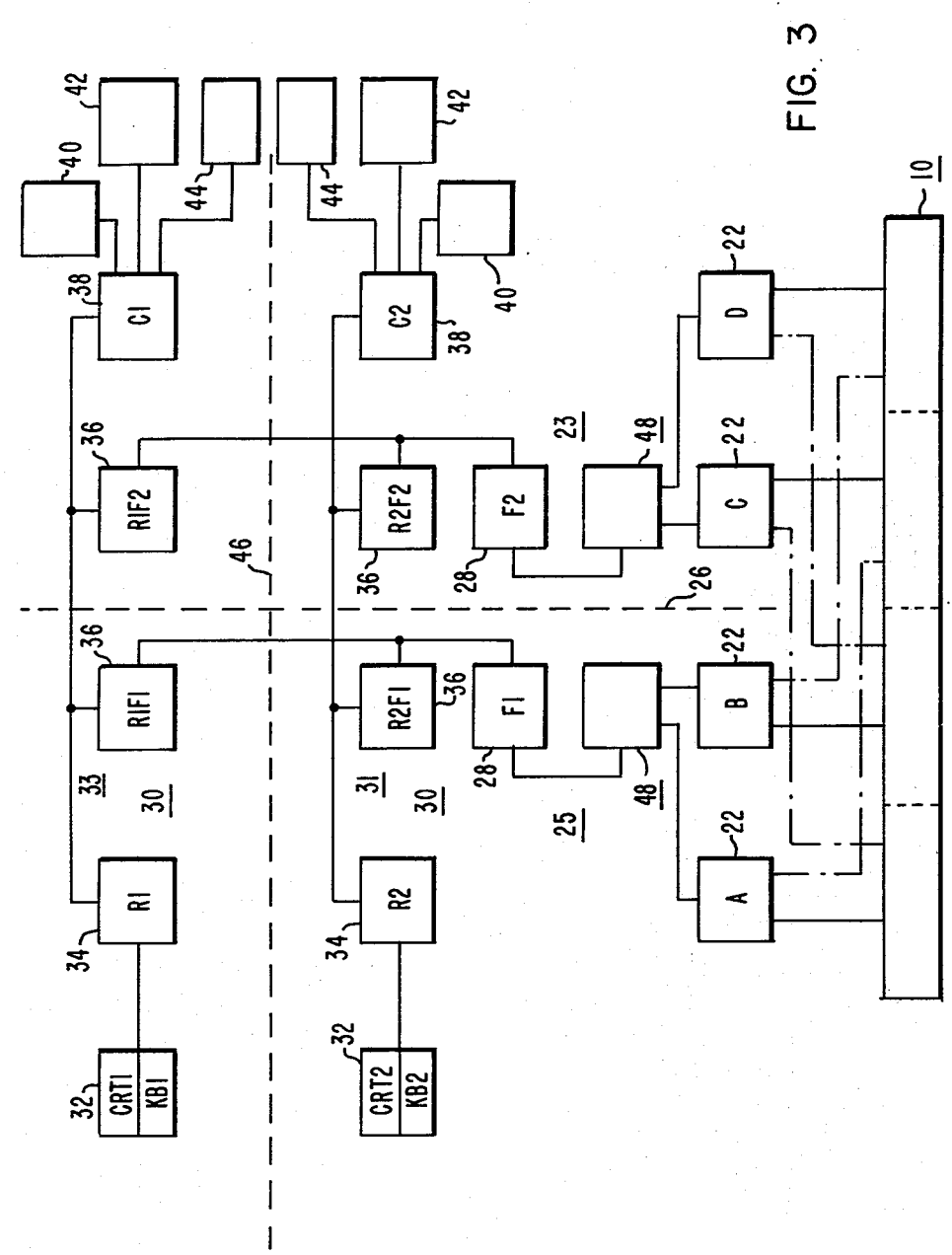
FIG. 3 is a block diagram of the arrangement of both the detector channels and the command and processing channels of one embodiment of this invention.
Figure 4:
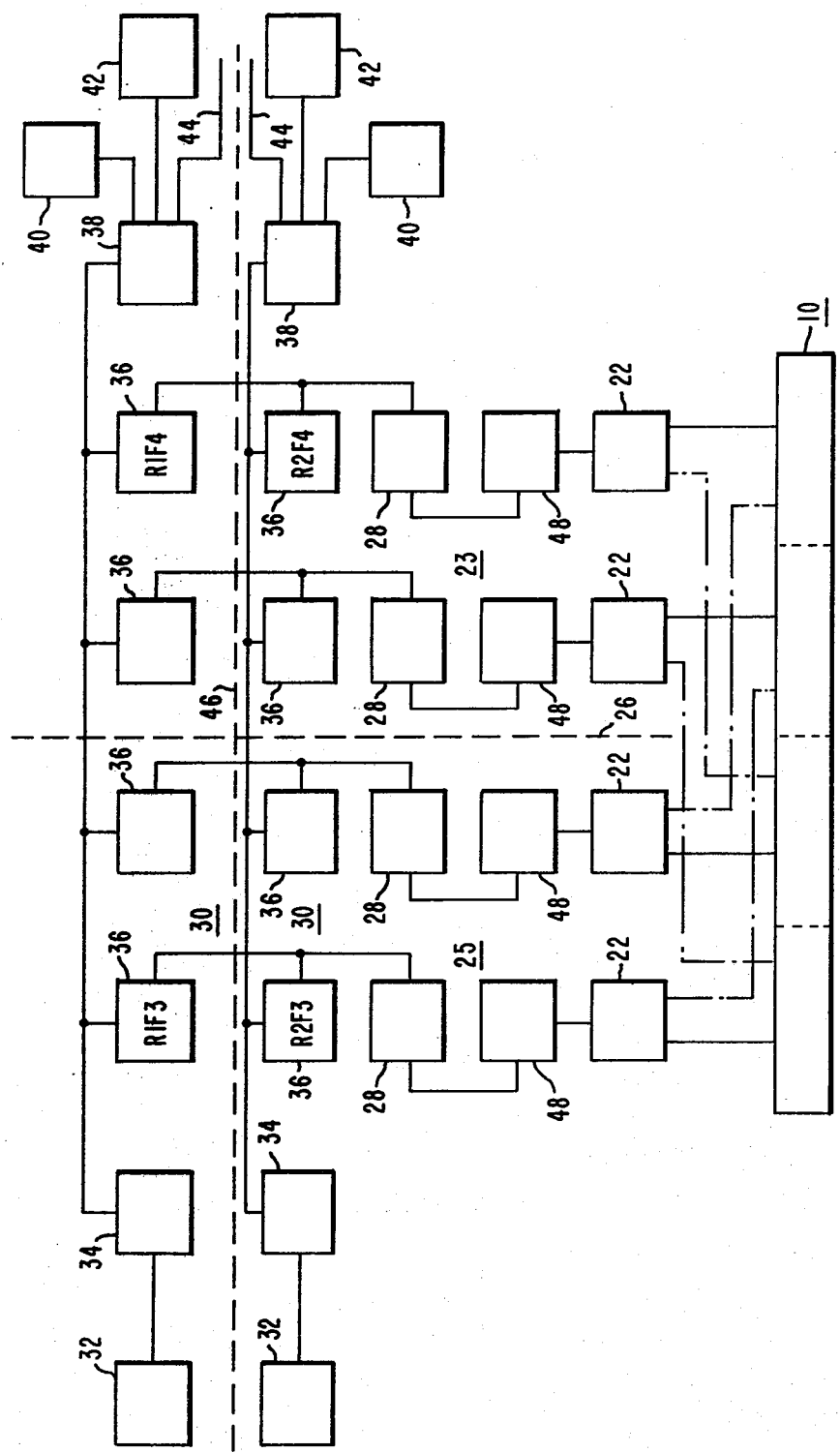
FIG. 4 is a schematic block diagram of both the detector channels and command and processing channels of a second embodiment of this invention.

The electronics and peripheral devices indicated by the various blocks shown in FIGS. 3 and 4 which are required to interface with an operator and control the detector drive system are composed of standard modular electronic card types, known as Q-series cards, that are used in a number of commercial microprocessor control systems, CAMAC remote input/output systems, process computer systems and remote energy data acquisition systems. The Q-series features modular construction and a bus architecture. Each of the Q-series cards are commercially available from the Westinghouse Industry Systems Division, 200 Beta Drive, Pittsburgh, Pennsylvania 15238 (Attention: Parts Dept.) by ordering by the appropriate catalog number, which will be identified in the description that follows. It should be appreciated, that functionally similar cards are available from other commercial manufacturers and can be employed to perform the various functions required by the separate blocks identified in both FIGS. 3 and 4.

The QMC (Catalog No. 2840A10) is the microcomputer card employed in blocks R1, R2, F1 and F2 and has as its base an 8080A microprocessor (manufactured by Intel Corp., Santa Clara, California). The card also contains a serial port, an elapsed time clock, a watchdog timer, program memory, and interfaces for two buses, the process input/output bus and the extended memory bus. Programs are in PROM memory.

Operator commands are supplied in a conversational manner through monochromatic, graphic CRTs with keyboards (32). Datum gathered during flux mapping passes are transmitted to printers (40) floppy discs (42) and data links (44) to the plant data acquisition computer. QMD (Catalog No. 2840A83) data link controller (38), cards are used to communicate with these devices, the QMD contains an 8080A microprocessor, program memory, two serial ports, and a two-ported RAM memory that interfaces the on board microprocessor with the QMC microprocessor via the extended memory bus. The QMD is programmed to handle message formatting or protocol and is employed in each of the controller blocks 38, C1 and C2.

Control of the mechanical drive equipment is accomplished using various standard card types and is illustrated by block 48 in FIG. 3. This process input/output block includes Triac output, QTO, cards (Catalog No. 2840A17), controlled by the QMC via the process input/output bus, which actuate the eight transfer motors while position feedback from the eight transfers is monitored by contact input, QCI, cards (Catalog No. 7379A06). Relay output, QRO cards (Catalog No. 2840A18) provide the interface to motor controllers for control of the four drive motors. The position of the flux detectors that move through the core is monitored by magnetic resolver input, QRI, cards (Catalog No. 7379A08) which measures the time interval between a reference and a feedback signal to determine distance. The interface to the neutron detectors is through detector supply, QDS (Catalog No. 7379A25), and analog output, QAI (Catalog No. 2840A19), cards. The QAI cards contain 16 bit analog/digital converters of which 12 bits are used for signal conversion resolution.

In order to achieve a higher degree of system availability in the design of the flux mapping system, a combination of functional separation and redundancy is employed in the design of the electronics as previously described. Two-ported RAM memory, QMS, cards (Catalog No. 2840A85) employed in blocks 36 (R1F1, R1F2, R2F1, and R2F2) permit the redundant and functionally separate channels to operate in harmony with each other.

The QMS allows two microprocessors to share data and is designed to meet three essential requirements. The first is that no single failure of any component on the QMS can cause both ports to wait or hang-up both buses. The second requires that effects of defective bus circuits connected to one port are not permitted to propagate through the QMS and cause circuit malfunctions on the bus connected to the other port. And the third is that two adjacent bytes of data may be accessed by either port without interruption. It can be appreciated by referring to FIG. 5 which shows a block diagram of the QMS card and FIG. 6 which shows the QMS card connected in a typical application that the QMS card provides four thousand bytes of shareable RAM used by the two QMC cards. Two independent ports have access to the memory via identical bus connectors. Each port can be individually programmed as one of sixteen blocks of memory, corresponding to the four most significant bits of the sixteen bit address word.

Buffers isolate the two ports and simultaneous access by both ports is not permitted. In addition, neither port may monopolize the memory for more than 16 clock cycles. Attempted simultaneous accessing by both ports results in one port being issued a momentary wait command via the ready control line 54.

Figure 5:
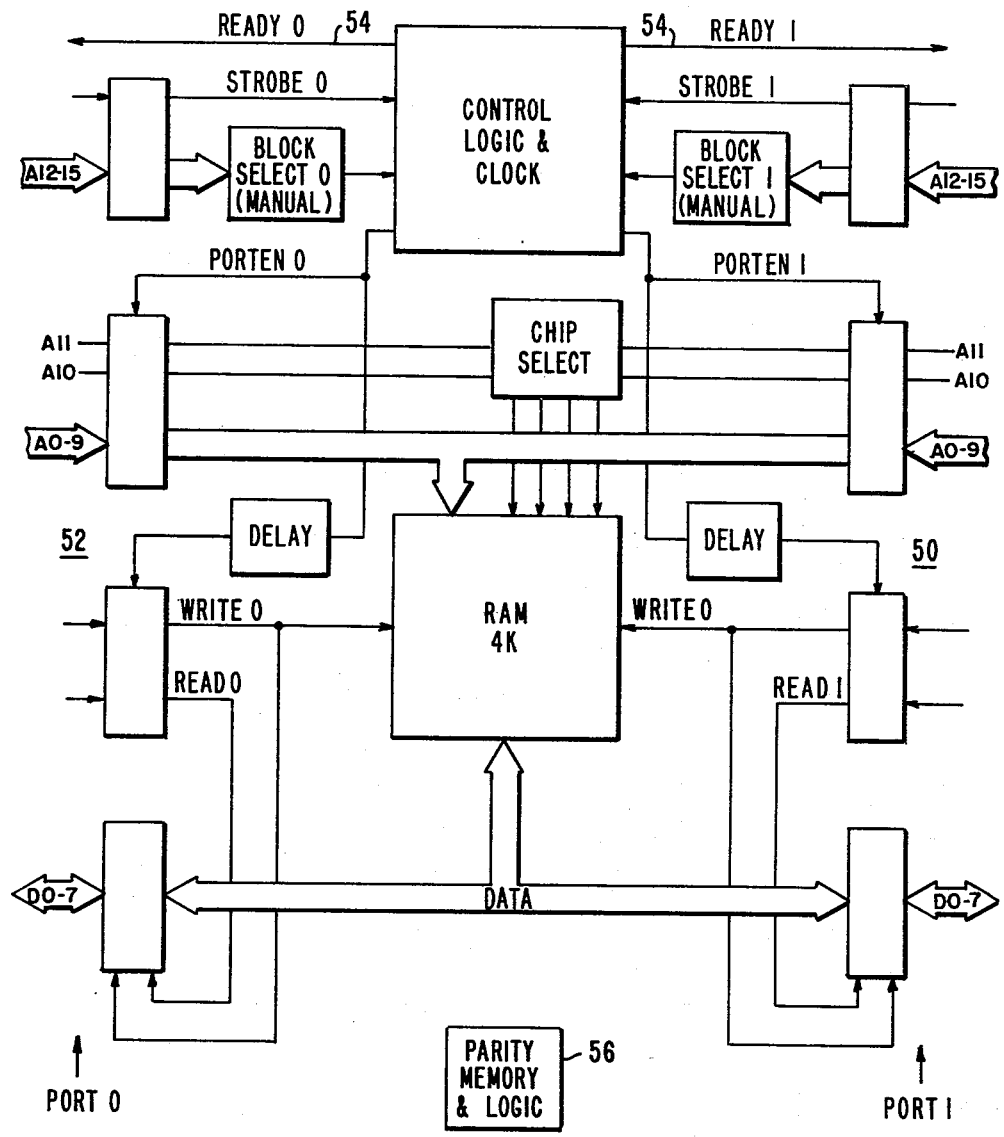

The two ports 50 and 52 of the QMS are identified as port 0 (52) and port 1 (50) in FIG. 5. They are identical in all respects and neither port has implied priority over the other.

Figure 6:
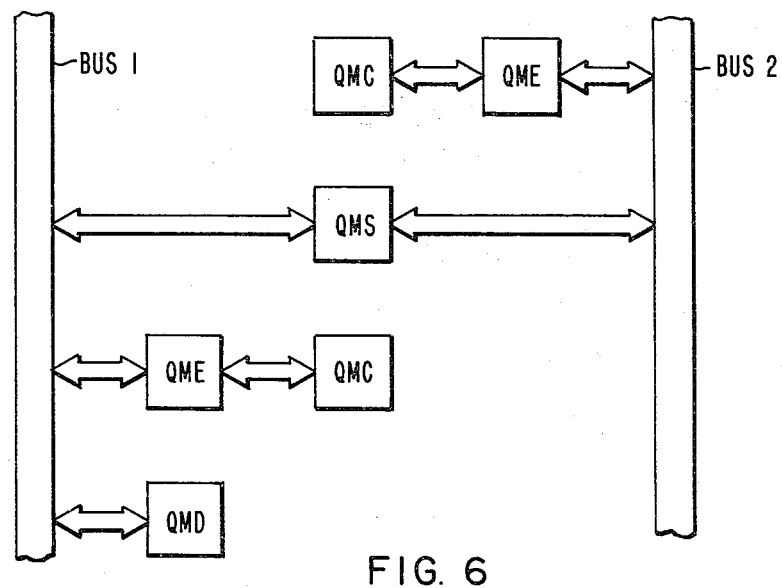
FIGS. 5 and 6 are schematic block diagrams of the shared two-ported memory systems employed by this invention to buffer the separate channels to prevent the propagation of faults through the system.

The QMS has on-card parity check logic and a parity memory identified by reference block 56. When a word is WRITTEN, a parity value is generated and stored in the corresponding bit of the parity memory. Thus, each byte of the RAM has a corresponding parity byte in the parity memory. When a READ is done, a parity value is again generated for the READ byte and COMPARED with the stored value. If the two are different, a parity error flag is set (visual indication is provided by an LED). The parity error flag is the bit 0 of the highest address word of the QMS. A typical two-ported memory arrangement employing the QMS card is illustrated in FIG. 6. A more detailed description of the two-ported memory can be found in application Ser. No. 950,652, filed Oct. 12, 1978 (W. E. 46,885). The QME card (Catalog No. 2840A15) is a memory extend which interfaces between the microcomputer QMC card and each bus.

For entry into the system, the operator selects a keyboard from one of the command and processing systems 30 illustrated in FIG. 3. The selection is arbitrary as long as the system is entirely operable. If status information or visual observation indicates that a hardware malfunction exists, the operator chooses the keyboard that minimizes the impact of the malfunction on total system operation.

If the operator selects keyboard KB1, peripheral microcomputer, R1 communicates the operator request to both drive control microcomputers F1 and F2 through the two-ported memories R1F1 and R1F2, respectively. Drive control microcomputers, F1 and F2, control the drive trains 22 and communicate data gathered from the drive system detectors back to the peripheral microcomputer R1 via the same two-ported memories R1F1 and R1F2. Peripheral microcomputer R1 then distributes the data gathered during the flux map passes to peripheral controller C1. If, however, keyboard KB2 is used, microcomputer R2 would communicate request to microcomputers F1 anf F2 through the two-ported memories R2F1, and R2F2, respectively, and microcomputers F1 and F2 communicate the gathered data back to microcomputer R2 via the same two-ported memories R2F1 and R2F2. Microcomputer R2 then distributes the data to controller C2. Thus, redundant control and processing channels 30 are established.

In normal operation, microcomputer F1 controls drive trains A and B and microcomputer F2 controls drive trains C and D. The data gathered by microcomputer F1 is stored in the two-ported memories R1F1 or R2F2; the data gathered by microcomputer F2 is stored in the two-ported memories R1F2 or R2F2. In the event of a failure of microcomputer F1, control of the associated drive trains A and B is lost. In the event of a failure of microcomputer F2, control of the associated drive trains C and D is lost. It should be noted that the mechanical arrangement of the drive system as illustrated in FIG. 2 allows one microcomputer to employ the detectors under its control to gather data normally acquired by the other. Thus, an optimum compromise of redundancy and isolation is achieved.

FIG. 4 illustrates a second embodiment which maintains the concept of separation taught by this invention with added redundancy provided to the independent, complementary detector drive channels 23 and 25. In this embodiment, each drive train 22 is provided with its own process input/output electronics 48 and microcomputer 28 and is buffered from the redundant control and processing channels by corresponding two-ported memories R1F3, R2F3 and R1F4, R2F4. The system's operation is identical to that described for FIG. 3 with each of the separate drive trains having independent paths of communication to the control and processing channels. Therefore, the loss of any individual train will not effect the other train in the same channel. The loss of any individual train can be compensated for by either one or complementarily all the other trains.

Many of the features for improved operator convenience and system performance of the flux mapping system are made possible through use of the microprocessor based systems implementation of the flux mapping system. In spite of the many improvements that this technology makes possible, a few potential problems are inherent in these types of systems and must be regarded against in the design of the system. The most common of these is an increase in vulnerability to single random device failures. A microprocessor, like all computer base systems, uses multiplexing to transfer data among the memory, input/output circuitry, and central processing unit. It then performs individual tasks one at a time in sequencial order and with sufficient speed so that to the outside world, the functions appear independent. Single failures, especially within the central processing unit, memory, and multiplexing bus can result in erratic operation of several output devices. In the case of a flux mapping system, if all functions had been assigned to one central processing unit then any of a number of single failures could have caused erratic operation of all drive mechanisms and displays simultaneously. Although failures are expected infrequently, the resulting total loss of function as well as potential equipment damage is considered unacceptable. This invention provides a system architecture to minimize the impact of such failures while maintaining the primary advantages of a microprocessor based system.

The resulting system utilizes a combination of partitioning (functional channels), redundancy, and hardware interlocks to contain faults and to allow completion of the tasks by the surviving portion of the system. Partitioning refers to the purposeful segregation of functions with the minimum replication of circuitry.

Accordingly, this invention provides a flux mapping system that contains many desirable features for operator convenience and performance but is without the problems common to many microprocessor based systems. The use of multiple microprocessors allows the system to be highly automatic and allows the concept of partitioning and redundancy to be employed, which results in high system availability.

We claim as our invention:
1. An improved nuclear reactor flux mapping system including a plurality of neutron detectors operable to be driven into and out of the reactor core along any one of a number of pre-established paths wherein the improvement comprises the detectors, corresponding drives and drive controllers being arranged into at least two physically separate and functionally independent channels, each channel respectively arranged to scan complementary paths through the core and at least two redundant, functionally independent and physically separate "command and processing" channels each independently, redundantly, alternatively operable to automatically sequence the detector scans and process the detector output data on all of the detector channels while being electrically buffered from each detector channel in a manner to prevent faults on any of the detector channels from disabling either command and processing channel.

2. The improved nuclear reactor flux mapping system of claim 1 wherein the automatic operation of each of the command and processing channels are independently programmable on line to alter the order or path of the automatic sequencing of the detectors or the type or format of the detector data processing.

3. The improved nuclear reactor flux mapping system of claim 1 wherein any one of the command and processing channels can direct any detector on any one of the detector channels to travel any one of the pre-established paths.

4. The improved nuclear reactor flux mapping system of claim 1 wherein each command and processing channel is buffered from each other.

5. The improved nuclear reactor flux mapping system of claim 1 comprising two command and processing channels and four detector channels.

6. The improved nuclear reactor flux mapping system of claim 1 comprising two of the command and processing channels and two detector channels.

7. An improved nuclear reactor flux mapping system including a plurality of neutron detectors operable to be driven into and out of the reactor core along pre-established paths, means for routing each detector along any of the pre-established paths and means for driving the detectors along the pre-established paths into and out of the reactor core wherein the improvement comprises:

means for dividing the detectors, and corresponding detector drives into first and second physically separate and functionally independent groups;

a first detector control means for sequencing the first group of detectors through a designated first group of the pre-established paths and communicating the first group of detector outputs;

a second detector control means for sequencing the second group of detectors through a designated second group of the pre-established paths and communicating the second group of detector outputs, the second detector control means being physically separate and functionally independent of the first detector control means;

a first electrical processor for automatically directing the operation of the first and second groups to scan the reactor core along complementary paths and present the detector outputs, in a pre-established programmed manner;

a first buffer element communicably coupled between the first electrical processor and the first detector control means for presenting communications from and to the first electrical processor to and from the first detector control means while isolating the first electrical processor and its communication lines from potential faults that could be communicated by the first detector control means;

a second buffer element communicably coupled between the first electrical processor and the second detector control means in parallel with the first buffer element for presenting communications from and to the first electrical processor to and from the second detector control means while isolating the first electrical processor and its communication lines from potential faults that could be communicated by the second detector control means;

a second electrical processor redundantly coupled in parallel with the first processor on a physically separate and functionally independent communication channel, the second processor being operable to automatically, independently direct the operation of the first and second groups to scan the reactor core along complementary paths and present the detector outputs in a pre-established programmed manner;

a third buffer element communicably coupled between the second electrical processor and the first detector control means for presenting communications from and to the second electrical processor to and from the first detector control means while isolating the second electrical processor and its communication lines from potential faults that could be communicated by the first detector control means; and a fourth buffer element communicably coupled between the second electrical processor and the second detector control means in parallel with the third buffer element for presenting communications from and to the second electrical processor to and from the second detector control means while isolating the second electrical processor and its communication lines from potential faults that could be communicated by the second detector control means.

8. The nuclear reactor flux mapping system of claim 7 wherein the first and second processors are constructed to be operable independently upon command to direct any detector to assume the pre-established path of scan through the core of any other detector.

9. The nuclear reactor flux mapping system of claim 7 including:

a first controller for presenting selected portions of information presented by the first processor in a programmed format to multiple data collection devices; and a second controller for presenting selected portions of information presented by the second processor in a programmed format to multiple data collection devices independent of the first processor and the first controller.

10. The nuclear reactor flux mapping system of claim 7 wherein the first, second, third and fourth buffer elements are two-ported memory elements.

11. The nuclear reactor flux mapping system of claim 7 including means for independently programming the first and second processors on-line.

12. The nuclear reactor flux mapping system of claim 7 wherein each detector group comprises multiple detectors.

* * * * *